United States Patent [19]

Uetani et al.

[11] 4,220,694
[45] Sep. 2, 1980

[54] LEAK-PROOF ALKALINE CELL AND ITS PRODUCTION

[75] Inventors: Yoshio Uetani; Yasuyoshi Taniguchi; Kenichi Yokoyama; Seiichi Matsushima, all of Osaka, Japan

[73] Assignee: Hitachi Maxell, Ltd., Osaka, Japan

[21] Appl. No.: 44,248

[22] Filed: May 31, 1979

[30] Foreign Application Priority Data

| May 31, 1978 [JP] | Japan | 53-66133 |
| May 31, 1978 [JP] | Japan | 53-66135 |
| May 31, 1978 [JP] | Japan | 53-66137 |
| May 31, 1978 [JP] | Japan | 53-66139 |

[51] Int. Cl.² .................................................. H01M 2/08

[52] U.S. Cl. ....................................... 429/172; 429/185; 429/206

[58] Field of Search ................ 429/185, 171, 172, 206

[56] References Cited

U.S. PATENT DOCUMENTS 4,122,241   10/1978   Ciliberti, Jr. .................... 429/172 X Primary Examiner—Charles F. LeFevour
Attorney, Agent, or Firm—Birch, Stewart, Kolasch & Birch

[57] ABSTRACT

A leak-proof alkaline cell comprising a negative electrode collector and a gasket, characterized in that the negative electrode collector is coated with a film comprising a triazole compound at least at the part faced to the gasket.

9 Claims, 5 Drawing Figures

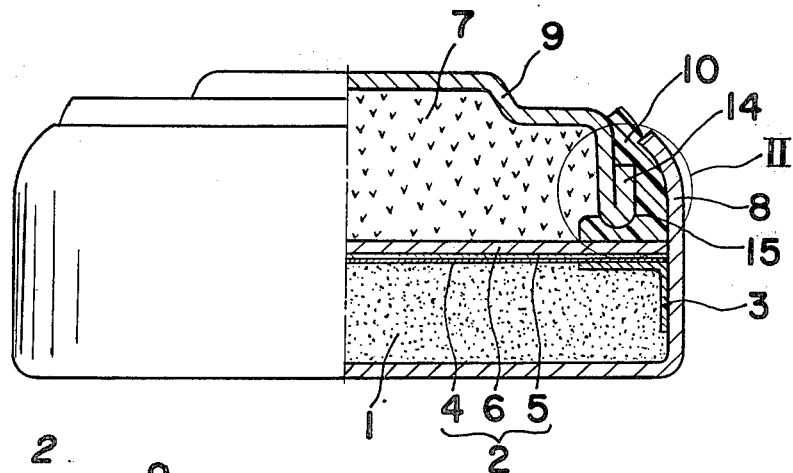
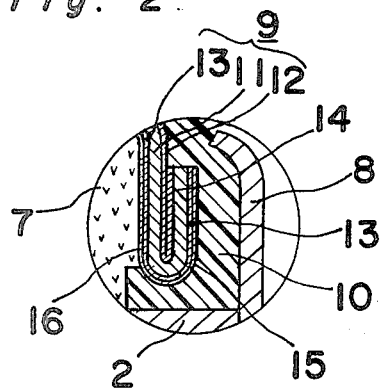
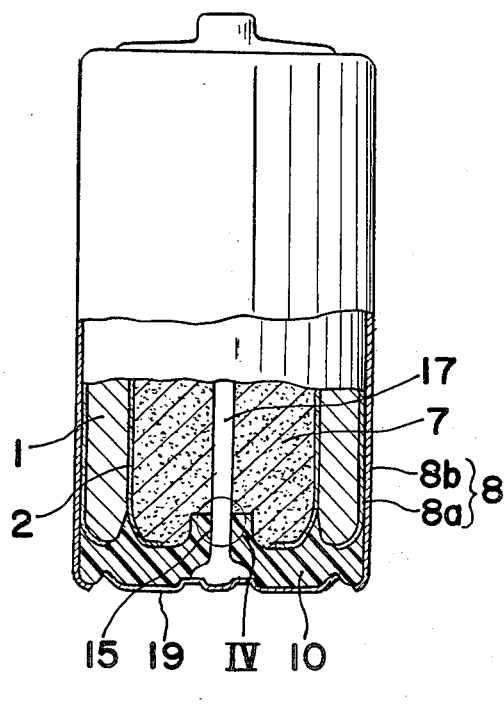
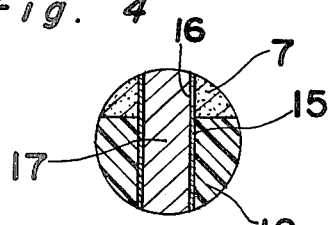
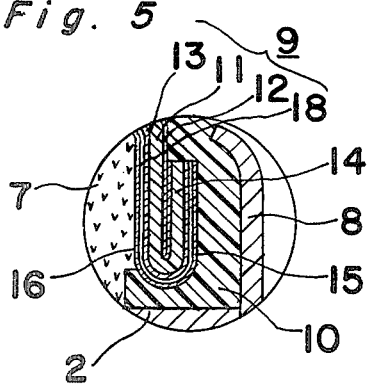

LEAK-PROOF ALKALINE CELL AND ITS PRODUCTION

The present invention relates to a leak-proof alkaline cell and its production.

In general, the leakage of an electrolyte from a cell is prevented by providing a gasket made of an elastic material such as rubbers, polyamides or polyolefins (e.g. polyethylene, polypropylene) at the open end of a positive can and crimping the rim of the positive can inwardly so as to press the gasket to a negative electrode collector such as a negative lead body or a negative cap.

In the case of an alkaline cell (e.g. silver oxide cell, manganese dioxide cell) wherein an alkaline electrolyte such as potassium hydroxide is used, however, the above closure manner is not sufficient to prevent the leakage of the electrolyte. In order to prevent leakage, there have been various proposals, for instance, formation of a negative cap in an appropriate shape and application of a liquid sealing material such as asphalt-pitch or oily fluororesin to the contact face(s) between the gasket and the positive can and/or between the gasket and the negative electrode collector. However, these proposals are not satisfactory to assure a good leakproof property as required for alkaline cells to be used in wrist watches, electronic exposure meters, etc.

Usually, the leakage of an electrolyte from alkaline cells is apt to occur at the contact face between the gasket and the negative electrode collector rather than at the contact face between the gasket and the positive can. This is probably due to the electrochemical creep phenomenon characteristic to a negative electrode collector. Therefore, it is important to enhance the leakproof property of the contact face between the gasket and the negative electrode collector.

For the purpose of making an alkaline dry cell sufficiently and satisfactorily leak-proof, an extensive study has been made. As the result, it has been found that the formation of a coating film comprising a triazole compound on the surface of a negative electrode collector at least at the part which is brought into contact with a gasket is effective in prevention of the leakage of an electrolyte from an alkaline cell. It has also been found that the leakage prevention effect is particularly remarkable when the formation of the coating film is made on the surface of copper or its alloy which may constitute at least a part of the negative electrode collector. It has further been found that the leakage prevention effect can be enhanced when the surface of the negative electrode collector on which the coating film is to be formed is previously polished and/or plated with gold. The present invention is based on these findings.

The details of construction of an alkaline cell made in accordance with the present invention, and various features of the cell, are more fully explained in the following description, taken together with the accompanying drawings, in which:

FIG. 1 is a front view with a partial section of a button type alkaline cell as an embodiment of the invention;

FIG. 2 is an enlarged view of the cell at the part II in FIG. 1;

FIG. 3 is a front view with a partial section of a cylinder type alkaline cell as another embodiment of the invention;

FIG. 4 is an enlarged view of the cell at the part IV in FIG. 3; and,

FIG. 5 is an enlarged view of a part in a button type alkaline cell as a further embodiment of the invention, the said part corresponding to the part II in FIG. 1.

In FIGS. 1 and 2, 1 is a positive depolarizing mix comprising a positive active material (e.g. silver(I) oxide, manganese dioxide, silver(II) oxide, mercury oxide) and an electro-conductive material (e.g. carbon black, graphite) in a weight ratio of 99:1 to 80:20 with or without a small amount of an alkaline electrolyte (e.g. 25 to 40%(w/w) aqueous solution of KOH, 20 to 30%(w/w) aqueous solution of NaOH) absorbed therein; 2 is a separator which comprises a microporous hydrophilic film 4 (e.g. polypropylene film), a cellophane film 5 and an absorptive layer 6 made of vinylon-rayon mixed paper and which is brought into contact with the positive depolarizing mix 1 and a metallic pedestal 3 made of iron, nickel or stainless steel and fixed on the periphery of the positive depolarizing mix; 7 is a negative electrode material mix comprising amalgamated zinc optionally with a gelling agent (e.g. sodium polyacrylate, carboxymethyl cellulose, starch) and a large amount of the electrolyte; and 8 is a positive can made of nickel-plated steel, into which the positive depolarizing mix 1 and the separator 2 are accommodated. At the open part of the positive can 8, a negative electrode collector 9 is fitted with intervention of an annular gasket 10 made of an elastic material such as rubbers, polyamides or polyolefins (e.g. polyethylene, polypropylene) and having an L-shaped section, and the rim of the positive can 8 is inwardly crimped to close tightly the contents of the cell.

The negative electrode collector 9 is constructed with a steel plate 11 about 180 microns thick having a nickel layer 12 about 20 microns thick at the outer surface for assuring good appearance as well as corrosion resistance and a copper layer 13 about 50 microns thick at the inner surface for preventing the formation of a local cell with the zinc active material. The negative electrode collector 9 is usually prepared by subjecting a clad plate consisting of a stainless steel plate, a nickel layer and a copper layer to draw forming to make a shape having the turn-up part 14 or by subjecting a stainless steel plate alone to draw forming to make a shape having the turn-up part 14, followed by plating with nickel and copper.

At the turn-up part 14 and its neighbouring part 15 which is brought into contact with an annular gasket 10, a coating film 16 comprising a triazole compound is provided on the copper layer 13 by applying a solution of a triazole compound and drying. The coating film 16 is chemically and firmly bonded onto the copper layer 13 due to the strong affinity of the triazole compound to copper.

In FIGS. 3 and 4, 1 is a positive depolarizing mix comprising manganese dioxide as a positive active material and an electro-conductive material (e.g. carbon black, graphite) in a weight ratio of 80:20 with or without a small amount of a 40%(w/w) aqueous solution of KOH as an electrolyte absorbed therein; 2 is a hydrophilic separator (e.g. vinylon-rayon paper); 7 is a negative electrode material mix comprising amalgamated zinc and a gelling agent (e.g. sodium polyacrylate, carboxymethyl cellulose, starch) in a weight ratio of 97:3 with a large amount of the electrolyte; and 8 is a positive can (e.g. a nickel-plated steel can) which consists of an inner can 8a and an outer can 8b and wherein the positive depolarizing mix 1 and the separator 2 are admitted. At the open end of the positive can 8, a negative cap 19 is fitted with intervention of an annular gasket 10 made of an elastic material such as rubbers, polyamides or polyolefins (e.g. polyethylene, polypropylene), and the terminal rim of the positive can 8 is inwardly crimped to close tightly the contents of the cell. A coating film 16 comprising a triazole compound is formed on a negative lead body 17 made of copper or copper-zinc alloy (e.g. brass) at the part 15 which is brought into contact with the gasket 10.

By formation of a coating film comprising a triazole compound on the negative electrode collector at least at the part which is brought into contact with the gasket, the resulting cell is satisfactorily prevented from leakage of the electrolyte. This good leak-proof property is particularly recognized when the coating film is formed on a substrate of copper or its alloy. Copper or its alloy may be more or less oxidized. The leakage preventing effect produced by the said coating film is much better than that obtained with a conventional coating film with a hydrophobic resin such as fluororesins, silicon resins and polyamide resins.

As the triazole compound, there may be used any compound having a triazole ring. Specific examples are 1,2,3-triazole, 1-methyl-1,2,3-triazole, 2-methyl-1,2,3-triazole, 4-methyl-1,2,3-triazole, 4,5-dimethyl-1,2,3-triazole, 4-phenyl-1,2,3-triazole, 5-chloro-1,2,3-benzotriazole, bis(benzotriazolyl-5), 4,5-dimethyl-1,2,3-triazole, 4-hydroxy-1,2,3-triazole, bis(benzotriazolyl-5)-methane, 1-amino-1,2,3-triazole, 5-amino-1-methyl-1,2,3-triazole, naphtho[1,2-d]triazole, 1,2,3-benzotriazole, 1-methylbenzotriazole, 5,6-dimethylbenzotriazole, 5-phenylbenzotriazole, 6-hydroxybenzotriazole, 1,2,4-triazole, 1-methyl-1,2,4-triazole, 3-methyl-1,2,4-triazole, 5-mercapto-1,2,4-triazole, 3-chloro-1,2,4-triazole, 1-amino-1,2,4-triazole, 5-amino-1,2,4-triazole, naphto[2,3-d]triazole, etc. That is, the triazole compound may be chosen, for instance, from 1,2,3-triazoles and 1,2,4-triazoles optionally bearing one or more substituents (e.g. lower alkyl, amino, hydroxyl, mercapto, halogen) or condensed rings (e.g. benzene, naphthalene). Among them, preferred are benzotriazoles optionally bearing one or more of lower alkyl, amino, hydroxyl, mercapto and halogen.

Irrespective of the cell being a button type or a cylinder type, the coating film comprising the triazole compound may be formed to produce equally the leakage prevention effect.

On formation of the coating film, it is favorable to smoothen the surface of the negative electrode collector, particularly the substrate of copper or its alloy for obtaining a better leak-proof property. In general, the surface of the cap 9 is roughened on draw forming so that, for instance, the roughness around the turn-up part 14 is deteriorated from 1 micron or less to 4-7 microns. Therefore, when desired, the roughened surface is smoothened by a conventional polishing procedure (e.g. mechanical polishing, electrolytic polishing, chemical polishing) to obtain a roughness of not more than about 3 microns, usually of 0.5 to 3 microns. Among various polishing procedures, chemical polishing by the use of a polishing solution such as an aqueous solution containing hydrogen peroxide and sulfuric acid respectively in concentrations of 7 to 18%(w/w) and of 1 to 5%(w/w) is preferred.

Further, the surface of a negative electrode collector may be plated with gold prior to the formation of the coating film so that the leak-proof property of the triazole compound is more enhanced. In FIG. 5, for instance, the negative cap 9 has a gold layer 18 plated on the copper layer 13 at the turn-up part 14 and its neighbouring part 15, and the coating film 16 comprising a triazole compound is formed on the gold layer 18 at the part which is brought into contact with the gasket 10. The thickness of the gold layer is usually around 0.1 micron. When the surface of the copper layer is polished chemically prior to gold plating, the leak-proof property will be more enhanced.

Furthermore, the negative electrode collector having the coating film on its surface may be integrally molded with the gasket so that the leakage of the electrolyte through the contact face between the negative electrode collector and the gasket is perfectly inhibited.

Practical and presently preferred embodiments of this invention are illustratively shown in the following Examples wherein part(s) is by weight unless otherwise instructed. The roughness was determined according to JIS (Japanese Industrial Standard) B-0601 (item 5).

EXAMPLE 1

A "CB Buraito" solution (manufactured by Ryoko Kagaku K. K.; 1%(w/w) aqueous solution of 1,2,3-benzotriazole) (10 liters) was admixed with water (90 liters) to make a dilute solution (hereinafter referred to as "solution (A)"). A negative electrode collector for a button type dry cell was defatted by immersing in a 5%(w/w) aqueous solution of sodium hydroxide under stirring for about 2 minutes, washed with water and immersed in the solution (A). After 4 to 5 minutes, the collector was taken out and dried at 20° C. for 12 to 24 hours. Using the thus treated collector, a button type dry cell was constructed in a conventional manner.

EXAMPLE 2

In the same manner as in Example 1 but using a 1%(w/w) aqueous solution of 1,2,3-triazole in place of a 1%(w/w) aqueous solution of 1,2,3-benzotriazole, a negative electrode collector for a button type dry cell was treated, and a button type dry cell was constructed with the treated collector.

EXAMPLE 3

In the same manner as in Example 1 but using a 1%(w/w) aqueous solution of 1-amino-1,2,4-triazole in place of a 1%(w/w) aqueous solution of 1,2,3-benzotriazole, a negative electrode collector for a button type dry cell was treated, and a button type dry cell was constructed with the treated collector.

EXAMPLE 4

In the same manner as in Example 1 but using a 1%(w/w) aqueous solution of 1-methyl-1,2,4-triazole in place of a 1%(w/w) aqueous solution of 1,2,3-benzotriazole, a negative electrode collector for a button type dry cell was treated, and a button type dry cell was constructed with the treated collector.

COMPARATIVE EXAMPLE 1

In the same manner as in Example 1 but using a hydrophobic agent "Sumiflunon FP-81" (manufactured by Sumitomo Chemical Co., Ltd.; an aqueous solution of a fluororesin) in place of a 1%(w/w) aqueous solution of 1,2,3-benzotriazole, a negative electrode collector for a button type dry cell was treated, and a button type dry cell was constructed with the treated collector.

COMPARATIVE EXAMPLE 2

In the same manner as in Example 1 but without immersing in the solution (A), a negative electrode collector for a button type dry cell was treated, and a button type dry cell was constructed with the treated collector.

EXAMPLES 5 TO 8

In the same manner as in Example 1, 2, 3 or 4, a negative electrode collector for a cylinder type dry cell was treated, and a cylinder type dry cell was constructed with the treated collector.

COMPARATIVE EXAMPLES 3 AND 4

In the same manner as in Comparative Example 1 or 2, a negative electrode collector for a cylinder type dry cell was treated, and a cylinder type dry cell was constructed with the treated collector.

Each of the dry cells prepared in Examples 1 to 8 and Comparative Examples 1 to 4 was cleaned at the surface and allowed to stand at 45° C. under a relative humidity of 90% for 1 or 3 months. Thereafter, an indicator prepared by dissolving cresol red (0.1 part) in a mixture of water (80 parts) and ethanol (20 parts) was dropped at the gasket part on the outer surface of the dry cell for detection of the leakage of the electrolyte; the presence of leakage gave the color change to red.

The results are shown in Table 1 wherein the numeral indicates the number of the dry cells having leakage in the tested 100 dry cells.

Table 1

| Example | Treating agent | Number of dry cells having leakage | |
|---|---|---|---|
| | | After 1 month | After 3 months |
| 1 | 1,2,3-Benzotriazole | 12 | 19 |
| 2 | 1,2,3-Triazole | 15 | 28 |
| 3 | 1-Amino-1,2,4-triazole | 16 | 30 |
| 4 | 1-Methyl-1,2,4-triazole | 15 | 29 |
| 5 | 1,2,3-Benzotriazole | 6 | 10 |
| 6 | 1,2,3-Triazole | 9 | 21 |
| 7 | 1-Amino-1,2,4-triazole | 9 | 20 |
| 8 | 1-Methyl-1,2,4-triazole | 8 | 18 |
| Comparative | | | |
| 1 | Fluororesin | 70 | 85 |
| 2 | — | 90 | 100 |
| 3 | Fluororesin | 39 | 55 |
| 4 | — | 52 | 70 |

From the above results, it is seen that a coating film of a triazole compound provided on a negative electrode collector is quite effective in preventing leakage in a dry cell incorporated with such collector.

EXAMPLE 9

A negative cap defatted and washed with water as in Example 1 was immersed in a 4%(w/w) aqueous solution of sulfuric acid for 5 to 10 seconds, washed with water and then immersed in an aqueous solution containing $H_2O_2$ and $H_2SO_4$ respectively in concentrations of 11%(w/w) and of 5%(w/w) with ethanol (concentration, 1%(w/w)) and a non-ionic surfactant (concentration, 0.1%(w/w)) at 50° C. for 1 minute. Thereafter, the cap was washed with water, immersed in a 4%(w/w) aqueous solution of sulfuric acid for 10 to 15 seconds and washed with water. Then, the cap was immersed in the solution (A) for 4 to 5 minutes and dried at 20° C. for 12 to 24 hours. Using the cap, a button type dry cell was constructed.

EXAMPLE 10

A negative lead body was subjected to chemical polishing and treatment with the solution (A) in the same manner as in Example 9. Using the lead body, a cylinder type dry cell was constructed.

Each of the dry cells as prepared in Examples 9 and 10 was cleaned at the surface and allowed to stand at 45° C. under a relative humidity of 90% for 1 or 3 months. Then, an indicator prepared by dissolving cresol red (0.1 part) in a mixture of water (80 parts) and ethanol (20 parts) was dropped on the outer surface at the gasket part for detection of leakage.

The results are shown in Table 2 wherein the results on the dry cells as prepared in Examples 1 and 5 are also shown for comparison.

Table 2

| Example | Type | Roughness of Surface ($\mu$) | | Number of dry cells having leakage/100 tested dry cells | |
|---|---|---|---|---|---|
| | | Before polishing | After polishing | After 1 month | After 3 months |
| 9 | Button | 7 | 2 | 3 | 5 |
| 10 | Cylinder | 5 | 2 | 2 | 4 |
| 1 | Button | 7 | — | 12 | 19 |
| 5 | Cylinder | 5 | — | 6 | 10 |

From the above results, it is understood that the chemical polishing of a negative cap or lead body reduces the roughness at the surface and is effective in prevention of leakage.

EXAMPLE 11

The negative cap as chemically polished in Example 9 was immersed in a gold plating bath prepared by dissolving potassium cyanoaurate (0.3 g) into a 1.5%(w/w) aqueous solution of potassium cyanide (1 liter), and a current of 2 mA was passed through for 1 minute, whereby the nearly whole surface of the cap was covered by a gold plating layer of 0.1 micron thick. After washing with water, the cap was immersed in the solution (A) for 4 to 5 minutes and dried at 20° C. for 12 to 24 hours. Using the thus treated cap, a button type dry cell was constructed.

Separately, the cap as treated above was immersed in a 0.5%(w/w) aqueous solution of dithioxamide containing gelatin for increasing the viscosity and allowed to stand overnight. As the result, it was confirmed that a considerable amount of the copper component as the substrate for the gold plating layer was dissolved out; this means that the gold plating layer has numerous pinholes.

EXAMPLE 12

A negative lead body was subjected to gold plating and treatment with the solution (A) in the same manner as in Example 11. Using the lead body, a cylinder type dry cell was constructed.

Each of the dry cells as prepared in Examples 11 and 12 was cleaned at the surface and allowed to stand at 45° C. under a relative humidity of 90% for 1 or 3 months. Then, an indicator prepared by dissolving cresol red (0.1 part) in a mixture of water (80 parts) and ethanol (20 parts) was dropped on the outer surface at the gasket part for detection of leakage.

The results are shown in Table 3.

Table 3

| Example | Type | Number of dry cells having leakage/100 tested dry cells | |
|---|---|---|---|
| | | After 1 month | After 3 months |
| 11 | Button | 1 | 3 |
| 12 | Cylinder | 1 | 2 |

From the above results, it is seen that the gold plating layer provided on the surface of a negative cap or lead body is effective in enhancing greatly the leak-proof property of a triazole compound.

EXAMPLE 13

The negative cap as treated in Example 9 was set in a mold for manufacture of a gasket, and a polyamide resin in a melt state was poured therein, followed by cooling. As the result, there was obtained an integral body of a negative cap and a gasket, with which a button type dry cell was constructed.

EXAMPLE 14

The negative lead body as treated in Example 10 was set in a mold for manufacture of a gasket, and a polyethylene-propylene blend resin in a melt state was poured therein, followed by cooling. As the result, there was obtained an integral body of a negative lead body and a gasket, with which a cylinder type dry cell was constructed.

Each of the dry cells as prepared in Examples 13 and 14 was cleaned at the surface and allowed to stand at 45° C. under a relative humidity of 90% for 1 or 3 months. Then, an indicator prepared by dissolving cresol red (0.1 part) in a mixture of water (80 parts) and ethanol (20 parts) was dropped on the outer surface at the gasket part for detection of leakage.

The results are shown in Table 4.

Table 4

| Example | Type | Number of dry cells having leakage/100 tested dry cells | |
|---|---|---|---|
| | | After 1 month | After 3 months |
| 13 | Button | 2 | 4 |
| 14 | Cylinder | 2 | 3 |

From the above results, it is understood that the use of an integral body of a negative electrode collector and a gasket is effective in prevention of leakage in the dry cells incorporated therewith.

What is claimed is:

1. A leak-proof alkaline cell comprising a negative electrode collector and a gasket, characterized in that the negative electrode collector is coated with a film comprising a triazole compound at least at the part contacting the gasket.

2. The cell according to claim 1, wherein the collector is made of copper or its alloy at least at the part contacting the gasket.

3. The cell according to claim 2, wherein a gold plating layer is provided on the surface of the collector at least at the part contacting the gasket.

4. The cell according to claim 3, wherein the gold plating layer is not more than 2 microns thick.

5. The cell according to claim 2 or 3, wherein the surface of the collector at least at the part contacting the gasket is smoothened.

6. The cell according to claim 5, wherein the smoothening is effected to give a roughness of not more than 3 microns.

7. The cell according to claim 1, 2 or 3, wherein the negative electrode collector is an integrally molded body with a gasket.

8. The cell according to claim 7, wherein the gasket is made of a synthetic resin selected from the group consisting of polyamides and polyolefins.

9. The cell according to claim 1, 2 or 3, wherein the gasket is made of a synthetic resin selected from the group consisting of polyamides and polyolefins.

* * * * *